United States Patent [19]

Sato et al.

[11] Patent Number: 4,526,010
[45] Date of Patent: Jul. 2, 1985

[54] SEPARATION TYPE AIR CONDITIONER

[75] Inventors: Yasuo Sato; Akio Fukushima; Toshiro Kaise, all of Shizuoka; Yoshiyuki Honda, Hyogo; Kazuho Uemura, Hyogo; Manabu Fujii, Hyogo, all of Japan

[73] Assignee: Mitsubishi Denki Kabushiki Kaisha, Tokyo, Japan

[21] Appl. No.: 258,492

[22] Filed: Apr. 28, 1981

[30] Foreign Application Priority Data

Apr. 30, 1980 [JP] Japan ................... 55-57427
Dec. 2, 1980 [JP] Japan ................... 55-170160

[51] Int. Cl.³ .............................................. F25B 49/00
[52] U.S. Cl. ...................................... 62/126; 62/180; 340/870.39; 371/34
[58] Field of Search ............... 62/180, 126, 127, 125; 236/51, 94; 340/870.39, 870.19, 825.57, 825.05; 371/34

[56] References Cited

U.S. PATENT DOCUMENTS

| 3,303,470 | 2/1967 | Brixner et al. | 340/825.57 |
| 3,562,729 | 2/1971 | Hurd | 340/870.39 |
| 3,717,858 | 2/1973 | Hadden | 340/870.39 |
| 3,805,234 | 4/1974 | Masters | 371/34 |
| 4,127,845 | 11/1978 | Dansbach et al. | 340/825.5 |
| 4,183,223 | 1/1980 | Alsenz | 236/51 |

OTHER PUBLICATIONS

*MCS-85 User's Manual*, Intel Corporation, 3065 Bowers Avenue, Santa Clara, Calif. 95051, Jan. 1978.
*Phase-Locked Loop Data Book*, Exar Integrated Systems, Inc., P.O. Box 62229, Sunnyvale, Calif. 94088, Nov. 1979.

*Primary Examiner*—Harry Tanner
*Attorney, Agent, or Firm*—Sughrue, Mion, Zinn, Macpeak, and Seas

[57] ABSTRACT

A separated-unit type air conditioner including indoor, outdoor and remote controller units all of which are provided at different locations. Each of the units is provided with a single pair of connecting terminals to which a control device such as a microcomputer is coupled. Data transmission between units is carried out on a single pair of connecting terminals utilizing a high frequency modulated signal. A DC power supply is provided in one of the indoor or outdoor units which supplies DC power to the other units upon the single pair of control lines.

10 Claims, 13 Drawing Figures

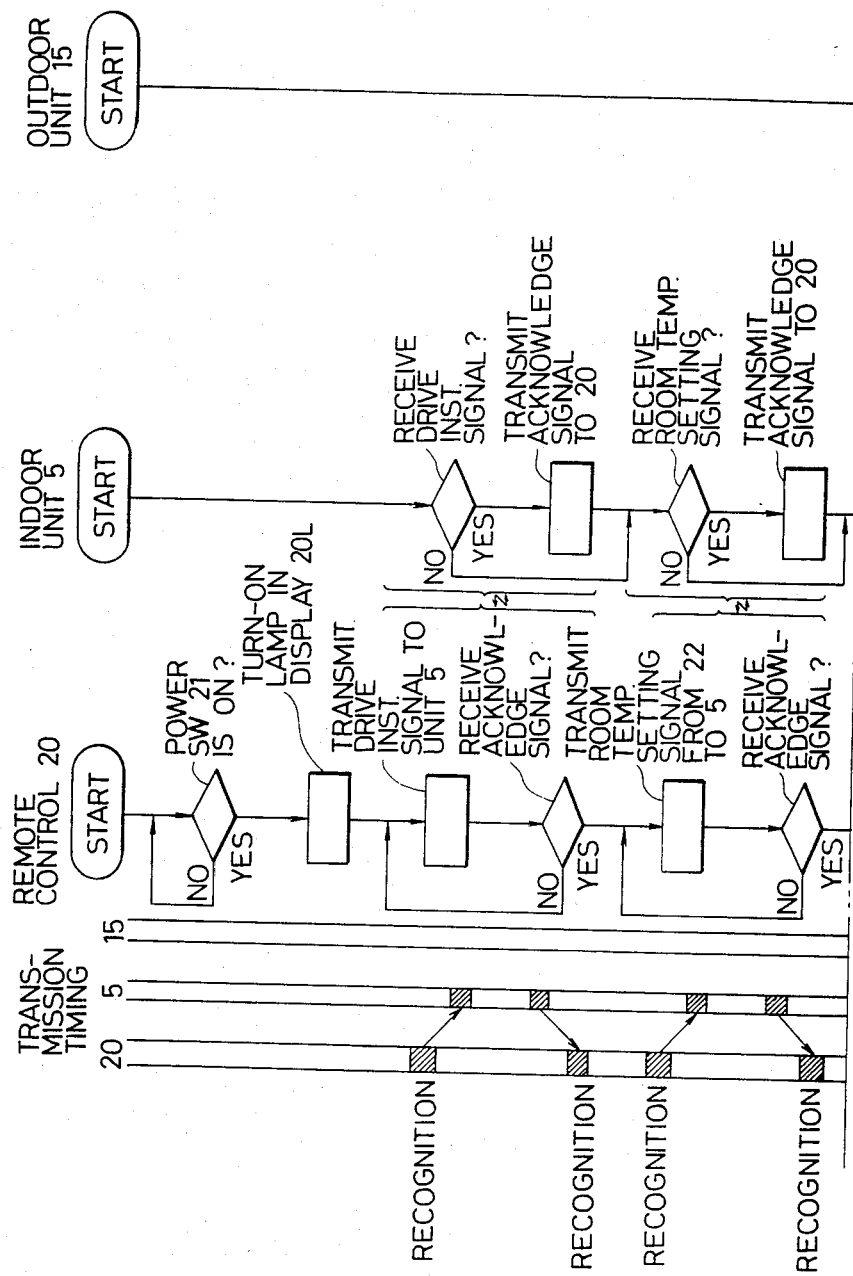

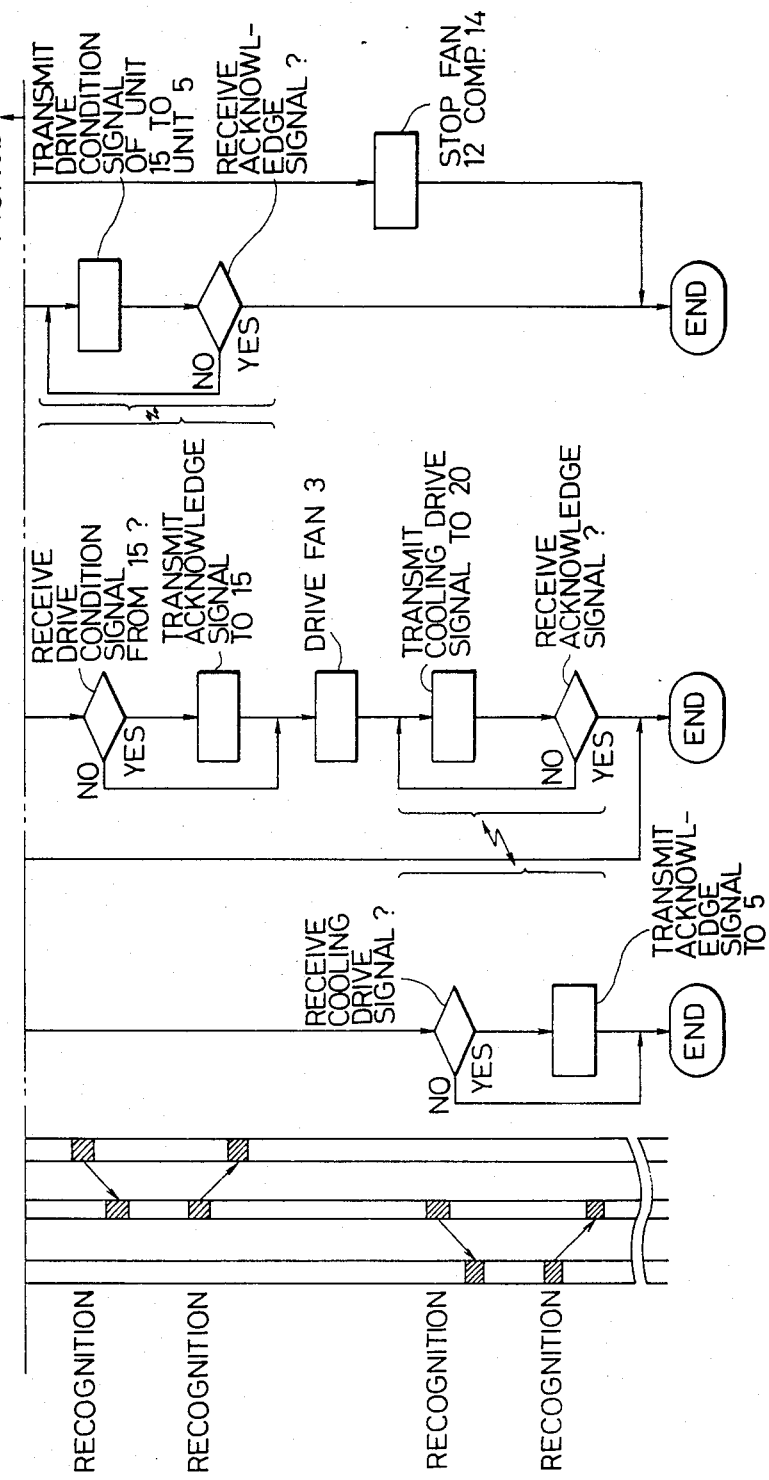

SEPARATION TYPE AIR CONDITIONER

BACKGROUND OF THE INVENTION

The present invention relates to an improved separated-unit type air conditioner, in which the compressor, the heat exchangers, the air blowing devices, and the expansion valves are suitably and separately provided in an indoor unit and an outdoor unit, and a remote controller for these units is provided at a location different from those of the indoor and outdoor units.

A conventional air conditioner of this general type is shown in FIG. 1. In FIG. 1, reference numeral 1 designates an indoor unit, 10 an outdoor unit, 20 a remote controller, 101 a three-phase (or single-phase) electric power line coupled to the indoor unit, 102 a three-phase (or single-phase) electric power line coupled to the outdoor unit, 103 control signal lines extending between the indoor unit 1 and the remote controller 20, 104 control signal lines between the indoor unit 1 and the outdoor unit 10, and 105 refrigerant piping extending between the indoor unit and the outdoor unit.

In general, in the conventional air conditioner, a number of control signal lines 103 are laid between an electronic controller (not shown) including a microcomputer provided in the indoor unit and the remote controller 20 including various operating switches, keys and light emitting elements for display. In addition, a number of control-signal lines 104 are connected between the indoor unit and the outdoor unit which are used to control a compressor, an air blower and various operating valves (not shown) in the outdoor unit using the outputs of the electronic controller in the indoor unit, and to input the signals of a temperature control thermostat and various protecting device (not shown) in the outdoor unit to the electronic controller in the indoor unit. A multiconductor cable having ten to twenty conductors is employed for the control signal lines 103, and a multiconductor cable having five to ten conductors is employed for the control signal lines 104.

However, appropriate multiconductor cables, especially the multiconductor cable having ten to twenty conductors used as the control signal lines 103, are not readily available commercially. Even if a multiconductor cable is available, the presence of the multiconductor cable may be rather unsightly. The appearance of the house or room may be maintained unchanged by locating the cable in the walls of the house. However, in this case, it is difficult to insert the cable into a conduit tube, and accordingly the entire wiring operation is considerably difficult. In addition, the employment of the multiconductor cable for the control signal lines 104 increases the time required for the installation and is liable to cause errors in the wiring since it is laid between the indoor unit and the outdoor unit.

Furthermore, the conventional air conditioner is disadvantageous in that, where a sensor (not shown) is added to the outdoor unit in order to save energy or to control the air conditioner so that the occupants of the room feel comfortable at all times, it is necessary to increase the number of control signal lines 104.

SUMMARY OF THE INVENTION

Accordingly, an object of the invention is to eliminate all of the above-described difficulties accompanying a conventional separated-unit type air conditioner. More specifically, an object of the invention is to provide an improved separated-unit type air conditioner for which cables used for its control signal lines are readily available and the wiring of the cables can be readily and correctly achieved without affecting the appearance of a house or room in which the air conditioner is installed.

Another object of the invention is to provide an improved separated-unit type air conditioner in which transmission of control signals between plural units forming the air conditioner is carried out through a single pair of control signal lines.

A further object of the invention is to provide an improved separated-unit type air conditioner which can be installed without taking into account the polarities of signal input terminals of a plurality of units forming the air conditioner and installed separately.

A still further object of the invention is to provide an improved separated-unit type air conditioner in which, even though a single pair of control signals is employed, no data transmission and reception error is caused.

A particular object of the invention is to provide a separated-unit type air conditioner in which a single pair of control signal lines is used to supply electric power from a DC source provided in one of the indoor unit and outdoor unit to the other and to a remote controller.

In accordance with these and other objects of the invention, there is provided a separated-unit type air conditioner having an indoor unit, an outdoor unit and a remote controller unit which are provided at three different locations. The remote controller unit includes a power switch and a temperature setting means. The remote controller unit is provided with a single pair of first connecting terminals, first control means for receiving signals from the power switch and the room temperature setting means to provide predetermined control outputs, data transmitting means connected between the first control means and the first connecting terminals to transmit data to the other units (in this case, the indoor unit and the outdoor unit), and data receiving means for receiving data from the other units. The indoor unit includes an indoor heat exchanger, an air blowing motor and an air blowing fan. The indoor unit is provided with a single pair of second connecting terminals, second control means for receiving a signal from a temperature sensor to provide a control output to drive the air blowing motor, data transmitting means interconnected between the second control means and the second connecting terminals to transmit data to the other units (in this case, the remote controller unit and the outdoor unit), and data receiving means for receiving data from the other units. The outdoor unit includes an outdoor heat exchanger, an air blowing motor, an air blowing fan and a compressor. As in the other two units, the outdoor unit is provided with a single pair of third connecting terminals. The outdoor unit further includes third control means for receiving a signal from a temperature sensor to provide control outputs to drive the air blowing motor and the compressor, data transmitting means connected between the third connecting terminals and the third control means (in this case, the remote controller unit and the indoor unit), and data receiving means for receiving data from the other units. A single pair of control signal lines is electrically connected to each of the first, second and third connecting terminals through which data transmission and reception is carried out between the units.

Each data transmitting means may include a modulator for high frequency modulating transmitted data on the control signal lines. A DC power source may be provided in one of the indoor unit and the outdoor unit for supplying DC power to each of the control means with DC power being supplied through the control signal lines to the other units. In the one of the indoor and outdoor units in which the DC power source is not provided, and in the remote control unit, there are provided circuits for non-polarizing the signals received on the respective connecting terminals to which the control signal lines are connected. This is preferably implemented by full-wave rectifier circuits. Direct current blocking means is then provided at the connecting terminal sides of the data transmitting means and the data receiving means of each of the units. Filter circuits may be also provided in each of the units.

To transmit data between any two of these three units, the first, second and third control means perform an inversion return comparison in which, for data transmission and control, a data receiving side returns data by inverting logic levels "1" and "0" of the received data. The data transmitting side then compares the data thus returned with the original transmitted data and outputs one of a coincidence signal and non-coincidence signal according to the results of the comparison. When a transmission error is detected a predetermined number of times, the control means operates to stop operation of the air conditioner and to inform the user of the abnormal condition.

The foregoing objects and other objects as well as characteristic features of the invention will become more apparent from the following detailed description and the appended claims when read in conjunction with the accompanying drawings.

DESCRIPTION OF THE PREFERRED EMBODIMENTS

Figure 1:
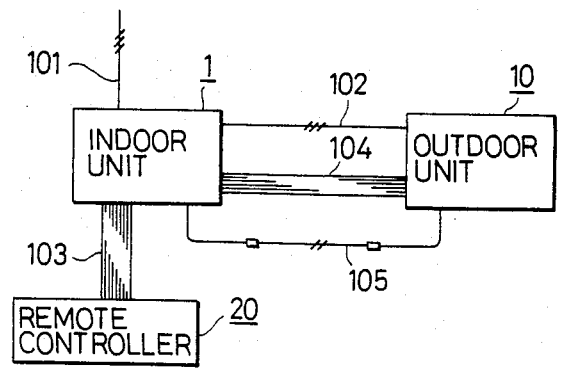
FIG. 1 is an explanatory diagram showing the arrangement of a conventional separated-unit type air conditioner.
Figure 2:
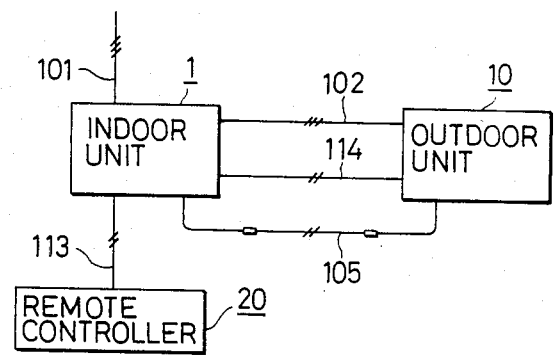
FIG. 2 is an explanatory diagram showing the arrangement of a preferred embodiment of a separated-unit type air conditioner according to the invention.
Figure 3:
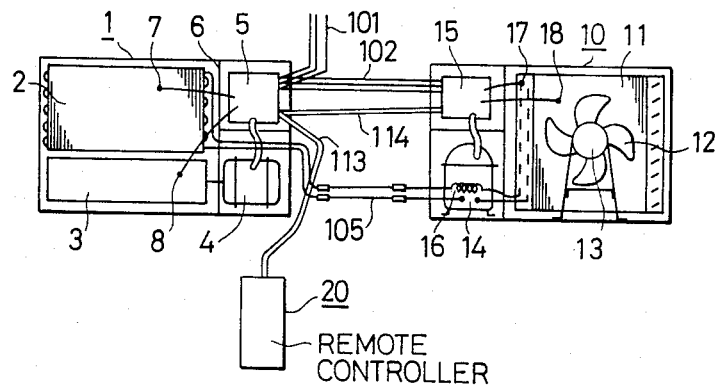
FIG. 3 is also an explanatory diagram showing the air conditioner in FIG. 2 in more detail.

A preferred embodiment of the invention will be described with reference to FIGS. 2 through 12. FIG. 2 is an explanatory diagram showing the arrangement of an example of a separate type air conditioner constructed according to the invention. FIG. 3 is also an explanatory diagram showing the arrangement in FIG. 2 in more detail. In FIGS. 2 and 3, reference numeral 1 designates an indoor unit, 10 an outdoor unit, 20 a remote controller, 101 a three-phase (or single-phase) electric power line coupled to the indoor unit 1, 102 a three-phase (or single-phase) electric power line coupled to the outdoor unit 10, 105 refrigerant piping connected between the indoor unit 1 and the outdoor unit 10, 113 a pair of control signal lines connected between the indoor unit 1 and the remote controller 20, and 114 of a pair of control signal lines between the indoor unit and the outdoor unit.

The indoor unit 1, as shown in FIG. 3, includes a heat exchanger 2, a line flow fan 3 for supplying air to the heat exchanger 2, a fan motor 4 connected to the power line 101 to rotate the fan 3, an indoor electronic controller 5 for transmitting control signals through the pairs of control signal lines 113 and 114 to the remote controller 20 and an outdoor electronic controller and receiving control signals therefrom to control the on-off operation of the fan motor 4, for instance. The indoor unit further includes a partition 6, a suction air temperature controller 7 connected to the electronic controller 5, and a blowing air temperature sensor 8 connected to the electronic controller 5.

The outdoor unit 10 includes a heat exchanger 11, a propeller fan 12 for supplying air to the heat exchanger 11, a fan motor 13 connected to the power line 102 to rotate the fan 12, a compressor 14 for compressing the refrigerant (not shown) which flows between the indoor unit 1 and the heat exchanger 2 through the refrigerant piping 105, an outdoor electronic controller 15 for transmitting control signals to the indoor electronic controller 5 and to the remote controller 20 through the pairs of control signal lines 113 and 114 and receiving control signals therefrom to control the on-off operations of the fan motor 13 and the compressor, a capillary tube 16, and a heat exchanger refrigerant temperature sensor 17 and an outdoor air temperature sensor 18 which are connected to the electronic controller 15.

As is apparent from FIGS. 2 and 3, in the air conditioner of the invention, transmission and reception of the control signals between the indoor unit 1, the outdoor unit 10 and the remote controller 20 are carried out through the pairs of control signal lines 113 and 114.

Figure 4:
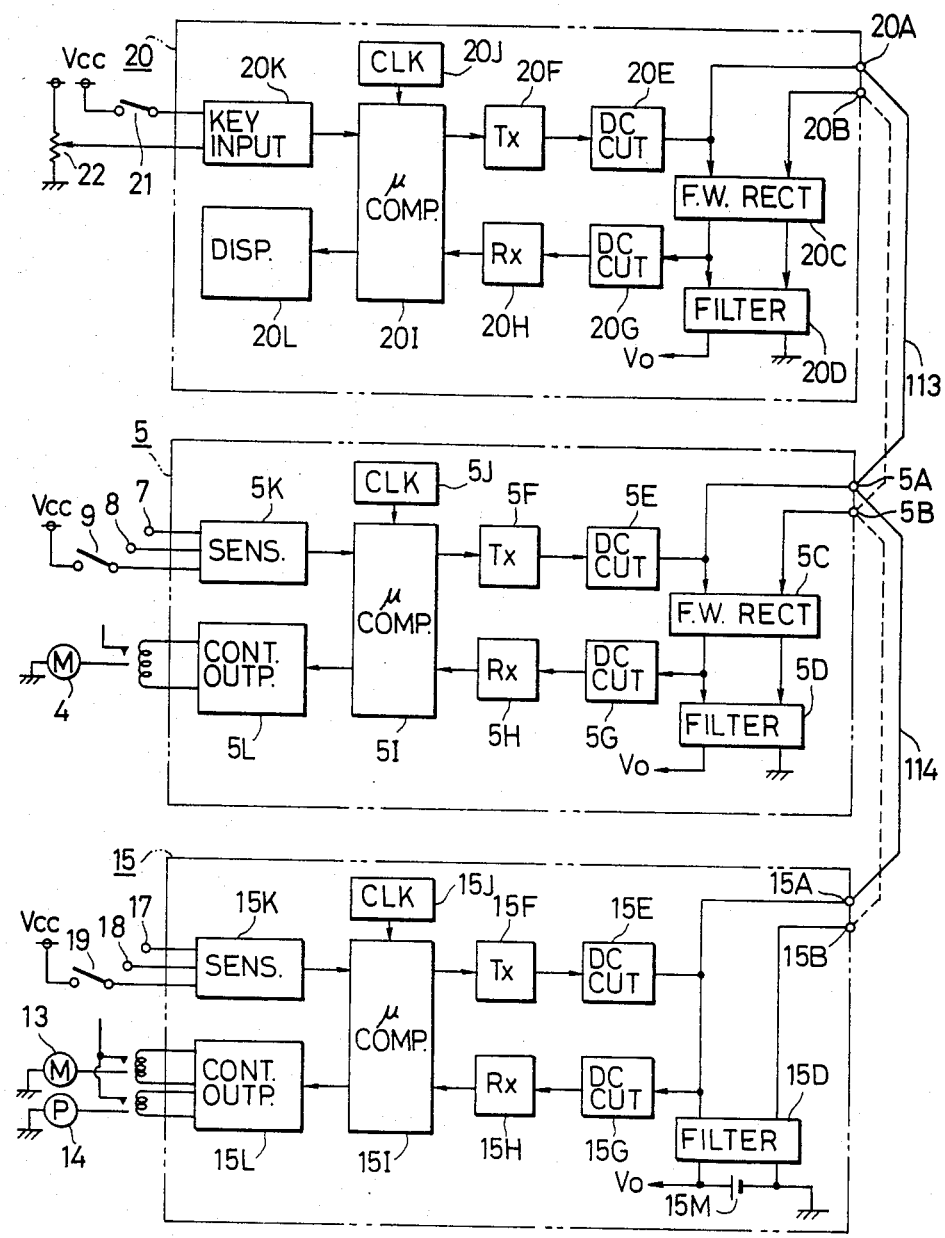
FIG. 4 is a block diagram showing specific electrical circuits of a remote controller, an indoor electronic controller and an outdoor electronic controller in FIG. 3.
Figure 5:
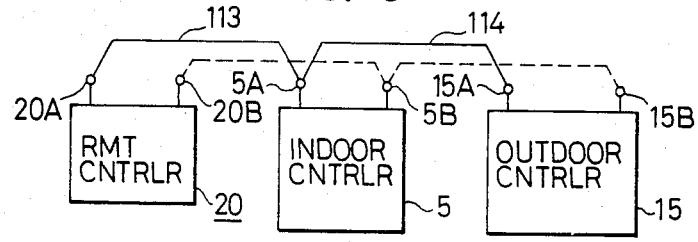
FIG. 5 through FIG. 9 are explanatory diagrams illustrating various ways of connecting a pair of control signal lines.

FIG. 4 is a block diagram showing examples of specific circuits of the remote controller 20, the indoor electronic controller 5 and the outdoor electronic controller 15 in FIG. 3. In FIG. 4, reference characters 20A, 5A and 15A and 20B, 5B and 15B designate the connecting terminals of the pairs of control signal lines 113 and 114, respectively. 20C and 5C are full-wave rectifiers 20D, 5D and 15D are filters, 20E, 5E and 15E and 20G, 5G and 15G designate direct current blocking circuits each constituted by an insulating transformer having primary and secondary coils, a photo-coupler or a high-pass filter, 20F, 5F and 15F are transmitters, 20H, 5H and 15H receivers, 20I, 5I and 15I microcomputers, 20J, 5J and 15J clock circuits, 20K an operation key input circuit, 20L a display unit for displaying the "on" and "off" states of the power source or a temperature set for a room, 5K and 15K sensor and switch input circuits, 5L and 15L, control output circuits, 15M a DC source unit composed of an AC power transformer, a rectifier circuit and a constant voltage control circuit, and $V_0$ designates a DC source.

Each of the microcomputers 20I, 5I and 15I may be of a type TMS 1000 integrated circuit manufactured by Texas Instruments Co. or an 8085AIC type manufactured by INTEL Co. The arrangement and operation of such a microcomputer are described in the user's manual "MSC-85 TM User's Manual" (January 1978) published by INTEL Co.

An on-off switch 21 for starting and stopping the air conditioner and a room temperature setting unit 22 for setting a room temperature to a desired value are connected to the operation key input circuit 20K.

The sensor and switch input circuit 5K operates to receive temperature signals from the sensors 7 and 8 in FIG. 3 and to receive on/off data from the switch 9 for detecting whether or not current is flowing for operating the motor 4.

In the control output circuit 5L, the output is applied to a relay coil to turn open and close the relay contacts thereof to control thereby the operation of the fan motor 4 as shown in FIG. 4.

The sensor and switch input circuit 15 operates to receive temperature signals from the sensors 17 and 18 in FIG. 3 and to receive on/off data from a high voltage or overcurrent detecting switch 19 for detecting whether or not the air conditioner is operating normally.

The output of the control output circuit 15L is applied to two relay coils, as seen in FIG. 4, so that the operations of the fan motor 13 and the compressor 14 are controlled according to the on-off operations of the relay contacts.

Each of the receivers 20H, 5H and 15H may be a type XR-567 integrated circuit manufactured by EXAR Co. The arrangement and operation of the receiver are described in a publication entitled "Phase-Locked Loop Data Book" (November 1979) published by that company.

In the transmitters 20F, 5F and 15F, the digital signal's high level is modulated with a high frequency transformer (not shown) so that it can be properly received by the receiver.

Figure 6:
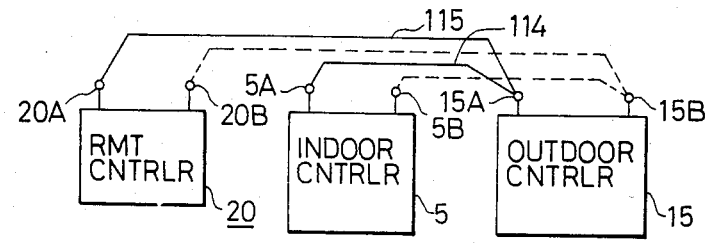
Figure 7:
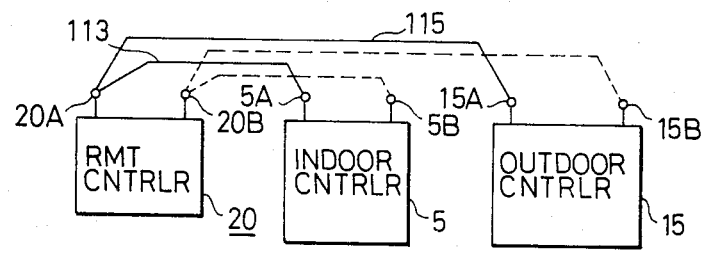
Figure 8:
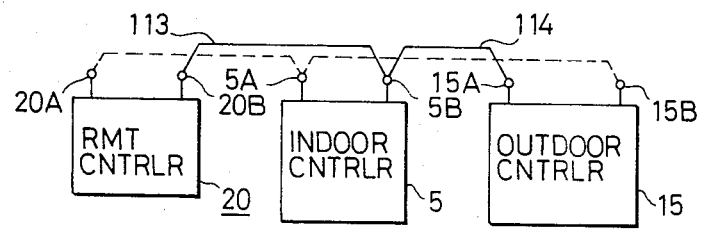
Figure 9:
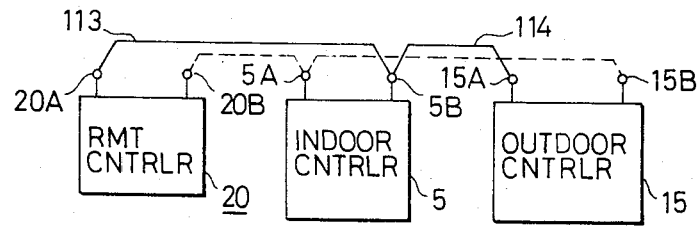

The above-described pairs of control signal lines 113 and 114 can be connected in various manners as shown in FIGS. 5 through 9. In these figures, reference numeral 115 designates a pair of control signal lines which, instead of one pair of control signal lines 113 and 114, are connected between the remote controller 20 and the outdoor electronic controller 15 (or the outdoor unit 100). More specifically, the control signal lines are connected between the connecting terminals 20A, 20B and 5A, 5B and between the connecting terminals 5A, 5B and 15A, 15B in FIG. 5. In FIG. 6, the lines are connected between the connecting terminal 20A, 20B and 15A, 15B and between the connecting terminals 15A, 15B and 5A, 5B. In FIG. 7, the lines are connected between the connecting terminals 20A, 20B and 5A, 15B. In FIG. 8, the lines are connected between the connecting terminals 20A, 20B and 15B, 5B and between the connecting terminals 5A, 5B and 15B, 15A. In FIG. 9, the lines are connected between the connecting terminals 20A, 20B and 5B, 5A and between the connecting terminals 5B, 5A and 15A, 15B. The lines can be connected in other manners.

The operation of the circuits of the air conditioner, as shown in FIG. 4, will now be described.

The microcomputers 20I, 5I and 15I are driven by the clock circuits 20J, 5J and 15J including ceramic oscillation elements. The operation thereof is effected with inputs from the operation key input circuit 20 and the sensor and switch input circuits 5K and 15K, the outputs to the display unit 20L and the control output circuits 5L and 15L and the transmitting and receiving signals of the transmitters 20F, 5F and 15F and the receivers 20H, 5H and 15H (i.e. the control signals). In this case, a tone burst signal (FIG. 10) modulated with a 50 KHz signal is employed as the control signal.

The DC voltage of the DC source unit 15M is applied to the control signal lines 113 and 114 through the filter 15D. However, it is not applied to the inputs and outputs of the transmitters 20F, 5F and 15F and the receivers 20H, 5H and 15H as it is blocked by the DC blocking circuits 20E, 5E and 15E and 20G, 5G and 15G. The DC voltage $V_0$ is applied through the control signal lines 113 and 114 and the connecting terminals 20A, 5A, 20B and 5B to the electronic circuits in the remote controller 20 and the indoor electronic controller. In this connection, the connecting terminals 20A and 5A and 20B and 5B are non-poliarized because of the provision of the full-wave rectifiers 20C and 5C. The transmitting and receiving signals are removed by the filters 20D and 5D. If necessary, the DC voltage is applied after being made into a constant voltage.

Figure 11:
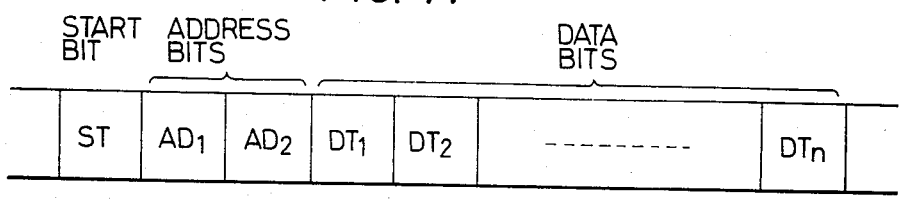
FIG. 11 is a diagram showing the arrangement of data in transmitting data according to a control system according to the invention.

The remote controller 20 is used to control the indoor and outdoor electronic controllers 5 and 15 (or the indoor and outdoor units 1 and 10) at a distance. The microcomputer 20I is operated according to the input which is set by the operation key input circuit 20K. When the input set by the operation key input circuit 20 is changed, or when a predetermined period of time has elapsed after an input change, for instance, when a period of time set by a timer (not shown) has elapsed, the microcomputer 20I outputs data to the transmitter 20F. The data is modulated with a 50 KHz signal to produce the tone burst signal. The tone burst signal, after being amplified, is applied through the DC blocking circuit 20E and the connecting terminals 20A and 20B to the control signal lines 113. The data is arranged, as shown in FIG. 11, to include a start bit (1 bit) modulated with a frequency of 41.7 KHz followed by address bits (2 bits) for specifying an address at a signal destination, and data bits (a predetermined number of bits).

As an example, if the address bits specify the microcomputer 5I in the indoor electronic controller 5, the transmitting signal received through the control signal lines 113 and the connecting terminals 5A and 5B, i.e. the receiving signal of the indoor electronic controller 5, is applied to the receiver 5H through the full-wave rectifier 5C after the DC voltage component has been removed by the DC blocking circuit 5G. In the receiver 5H, the signal is demodulated by a tone decoder implemented, for instance, with a PLL phase synchronization IC.

The output of the receiver 5H is applied to the microcomputer 5I. In the microcomputer 5I, the levels "1" and "0" of the data bits of the above-described data are inverted, and the start bit and the address bits are added to the data bits thus inverted to provide new data which is returned to the microcomputer 20I in the remote controller 20. In the remote controller 20, the data thus returned is compared with the original data transmitted in response to which a 1-bit signal is produced indicating that signal transmission and reception should be ended or signal transmission should be carried out again. Each time the microcomputer 5I receives the 1-bit signal, one data transmission and reception operation is completed. In this manner, the microcomputer 5I supplies an output signal, for instance, to rotate or stop the fan motor 4 (cf. FIG. 3).

In the case also where the microcomputer 5I of the indoor electronic controller 5 or the microcomputer 15I of the outdoor electronic controller 15 operates as the signal transmitting side, the operation is similar to that described above.

As described above, according to the invention, wiring connections between the indoor unit 1 (the indoor electronic controller 5), the outdoor unit 10 (the outdoor electronic controller 15) and the remote controller 20 are achieved with the pairs of control signal lines 113 and 114 only. Suitable cables for the control signal lines 113 and 114 are readily available and the wiring can be readily and correctly achieved. The use of such control signal lines is effective in that it is easy to insert them into a conduit tube when it is required to bury them in the wall of the room or house. Furthermore, the use of the control signal lines does not detract from appearance of the room or house.

The embodiment of the invention shown in FIG. 4 has the following additional effects:

(a) Since the connecting terminals 20A, 5A and 15A and the connecting terminals 20B, 5B and 15B are non-polarized, no polarity wiring error can occur.

(b) As wiring of the pairs of control signal lines 113 and 114 between the connecting terminals 20A, 5A and 15A and the connecting terminals 20B, 5B and 15B can be carried out in various combinations as shown in FIGS. 5 through 9, the degrees of freedom in the installation position of the remote controller are large. Therefore, during inspection and maintenance for instance, the remote controller 20 can be moved near the outdoor unit 10 (the outdoor electronic controller 15) for rewiring or to test the mutual operation thereof with ease and with high accuracy.

(c) Many pieces of information (data) can be transmitted and received without increasing the number of control signal lines 113 and 114.

(d) As direct current is supplied to the remote controller 20 from the DC source unit 15M of the indoor or outdoor electronic controller 5 or 15, it is unnecessary to provide a power source for the remote controller 20 thereby permitting miniaturization of the remote controller 20. In this case, the pairs of signal control lines 113 and 114 are used to feed direct current to the remote controller 20. However, it is unnecessary to increase the maximum voltage rating of these lines as the signal control lines may be of a type used for ordinary low voltage wiring.

(e) It can be readily detected by periodic signal transmission and reception between the microcomputers 20I, 5I and 15I whether or not the pairs of control signal lines 113 and 114 are short-circuited or broken.

A counter-measure against noise which may affect the control signal lines 113 and 114 will now be described. The control signals and the air conditioning data are transmitted between the units 1, 10 and 20 through the lines 113 and 114. In an air conditioner of this type, the lines 113 and 114 are usually installed adjacent to the power lines 101 and 102, and switches and relays are used to control the inputs and outputs of these units. Accordingly, the transmission signals are liable to be adversely affected by noise from the power lines, switches and relays, as a result of which erroneous signals might be transmitted between the units. In order to eliminate this difficulty, it is necessary to employ error control at the time of signal transmission. For this purpose, an inversion return comparison system may be employed in the invention. This system will be described.

Figure 10:
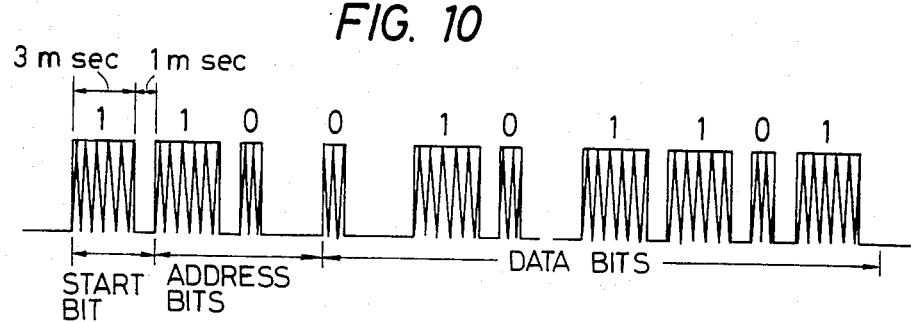
FIG. 10 is a diagram showing an example of a signal (or a control signal) transmitted mutually between the remote controller, the indoor electronic controller and the outdoor electronic controller in FIG. 4.

In this system, the transmission data is provided according to a modulation system as shown in FIG. 10. The transmission data is composed of a start bit (ST), address bits ($AD_1$, $AD_2$) for identifying the signal transmitting unit and the signal receiving unit, and data bits ($DT_1$-$DT_n$) which are obtained by encoding the control signal and air conditioning data, as described above with reference to FIG. 11.

Figure 12:
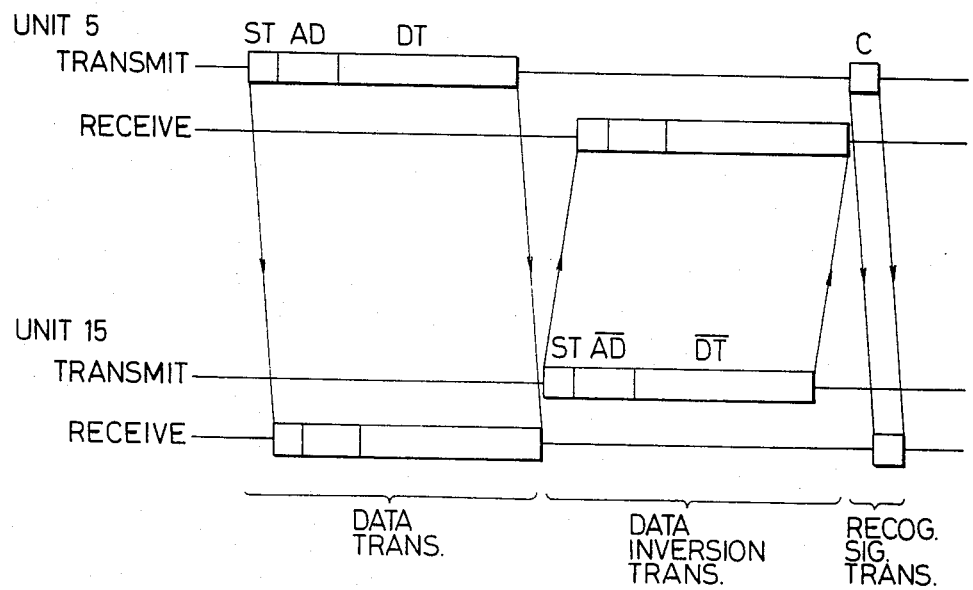
FIG. 12 is an explanatory diagram showing a procedure of data transmission.

FIG. 12 is an explanatory diagram illustrating a procedure of transmitting data from the unit 5 to the unit 15. The unit 5 transmits the start bit (ST), the address bits (AD) representative of the signal transmission to the unit 15 from the unit 5 and the data bits (DT). Upon reception of this signal, the unit 15 returns to the unit 5 the data bits ($\overline{DT}$) which are obtained by inverting the levels "1" and "0" of the data bits (DT) received, together with the start bit and address bits ($\overline{AD}$) indicating signal transmission to the unit 5 from the unit 15. If, in this case, the address bits ($\overline{AD}$) are so set as to be the complement of "1" with respect to the address bits (AD), the return data can be obtained by inverting the levels "1" and "0" of all the bits except for the start bit. In this manner, data inversion can be readily achieved.

Then, in the unit 5, the returned data and the original data transmitted therefrom are subjected to exclusive logical addition to check whether or not the transmission has been carried out correctly. A confirmation signal C is transmitted to the unit 15 to inform the unit 15 of the comparison result, i.e. coincidence or non-coincidence. In the case of coincidence, the unit 5 transmits a coincidence signal to the unit 15 in response to which the unit 15 carries out the control operation according to the data which has been previously received. On the other hand, in the case of non-coincidence, the unit 5 transmits a non-coincidence signal to the unit 15 and then transmits data again. When the unit 15 receives the non-coincidence signal, the previously-received data is eliminated from the unit 15 and the unit 15 is maintained in the previous state until data is transmitted thereto from the unit 5.

If the data transmission error is present repeatedly more than a predetermined number of times, there may be a problem such as a short-circuit or breakage of the signal lines. In this case, the air conditioner is stopped, and, for instance, a lamp is turned on to inform the user of the occurrence of trouble.

The inversion return comparison system has been described with respect to the units 5 and 15. However, it is similarly applicable to other combinations of the units including the remote controller.

As is apparent from the above description, in the inversion return comparison system of the invention, it is unnecessary to add error detection bits to the transmitting and receiving data, and the error check can be achieved merely by calculating the exclusive logical sum of the data. Thus, the procedure is simple, and yet the reliability of data transmission is very high. Furthermore, the system is advantageous in that the inversion operation can be simplified by setting the address bits as described above. As the transmission data and the inverted return data use the same format, the data transmission and the data inversion and return operations can be incorporated into the same procedure. In general, the air conditioner of this type employs an ordinary 4-bit, 1-chip microcomputer the program memory capacity of which is usually 1,000 to 2,000 bytes. In order to improve comfort and security and to economically use energy, the data transmitting and receiving program's capacity is greatly limited. Thus, if the transmission error control according to the inversion return comparison system having the above-described effects or merits is applied to the air conditioner as described above, a two-wire system separated-unit type air conditioner control system can be implemented without a corresponding lowering in the comfort level afforded by the system.

Figure 13B:
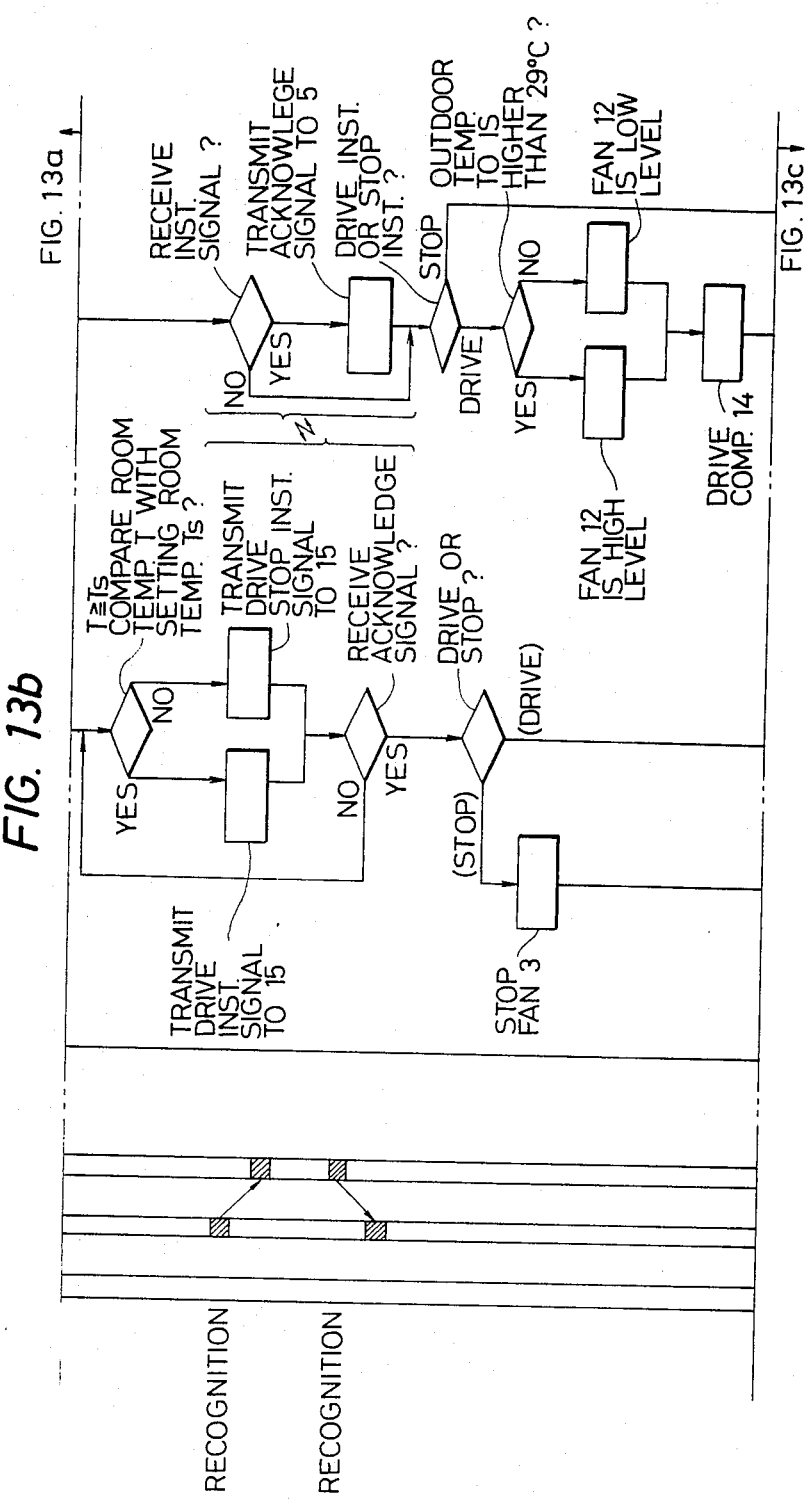
FIG. 13 is a flow chart and timing diagram indicating operations of microcomputers of controllers in the circuits of FIG. 4.

In FIG. 13 is a flow chart and timing diagram showing in detail the operations of the microcomputer 20I, 5I and 15I of the controllers 20, 5 and 15, respectively, as described above. To program the microcomputers 20I, 5I and 15I, the information from the flow chart can be translated directly into program steps with the precise form of the steps of course being determined by the particular type of microcomputer chosen. Program steps of a conventional nature may further be included if desired and the invention is not limited to the use of any particular sets of program instructions.

What is claimed is:

1. A separated-unit type air conditioner having an indoor unit, an outdoor unit and a remote controller unit which are provided at three different positions, the improvement comprising communication means for transmitting information between any two of said units over a two-wire connection, said communication means comprising:
   first means at a first of said any two units for transmitting binary data onto said two-wire connection together with a binary second address identifying data transmission to a second of said any two units;
   second means at said second unit for inverting said second address to form a first address identifying data transmission to said first unit, for inverting said data to form inverted data and for transmitting said first address and inverted data onto said two-wire connection, said first means comparing said data and inverted data to determine if said data was received correctly at said second unit.

2. The separated-unt type air conditioner as claimed in claim 1 in which each of said first and second means comprises a modulator for high frequency modulating wherein said binary data, inverted data and first and second addresses are transmitted in the form of a high-frequency modulated signal on said two-wire connection.

3. The separated-unit type air conditioner as claimed in claim 1, wherein said indoor unit, outdoor unit and remote controller unit each comprise control means requiring DC power, and in which one of said indoor unit and outdoor unit comprises a DC source device for supplying DC power to each of said control means, the electric power of said DC source device being supplied through said two-wire connection to the other of said indoor and outdoor units and to said remote controller unit.

4. The separated-unit type air conditioner as claimed in claim 3 in which said remote controller unit and said other of said indoor unit and outdoor unit in which said DC source device is not provided each comprise circuits for non-polarizing signals received over said two-wire connection.

5. The separated-unit type air conditioner as claimed in claim 4 in which each of said circuits for non-polarizing said signals comprises a full-wave rectifier circuit.

6. The separated-unit type air conditioner as claimed in claim 3 further comprising direct current blocking means provided between said two-wire connection and each of said first and second means.

7. The separated-unit type air conditioner as claimed in claim 3 in which said units which receive DC power from said DC source device each comprise filter circuits for receiving DC power from said two-wire connection and providing said DC power to said control means.

8. The separated-unit type air conditioner as claimed in claim 1 in which said first means carries data transmission again when said data has not been received correctly, and when incorrect reception of data is detected a predetermined number of times, operates to stop operation of said air conditioner and to inform a user of an abnormal condition.

9. A separated-unit type air conditioner as claimed in claim 1, wherein each of said indoor unit, outdoor unit and remote controller unit include both said first means and said second means.

10. A separated-unit type air conditioner as claimed in claim 9, said air conditioner including a temperature sensor for providing a temperature signal representing sensed temperature, wherein: said indoor unit includes an indoor heat exchanger, an air blowing motor, an air blowing fan and a first of said control means for receiving said temperature signal and providing a control output to drive said air blowing motor; said outdoor unit includes an outdoor heat exchanger, an air blowing motor, an air blowing fan, a compressor and a second of said control means for receiving said temperature signal and providing control outputs to drive said air blowing motor and compressor; and said remote controller unit includes a power switch, room temperature setting means and a third of said control means for receiving signals from said power switch and room temperature setting means to provide predetermined control outputs.

* * * * *